United States Patent Office 3,509,271
Patented Apr. 28, 1970

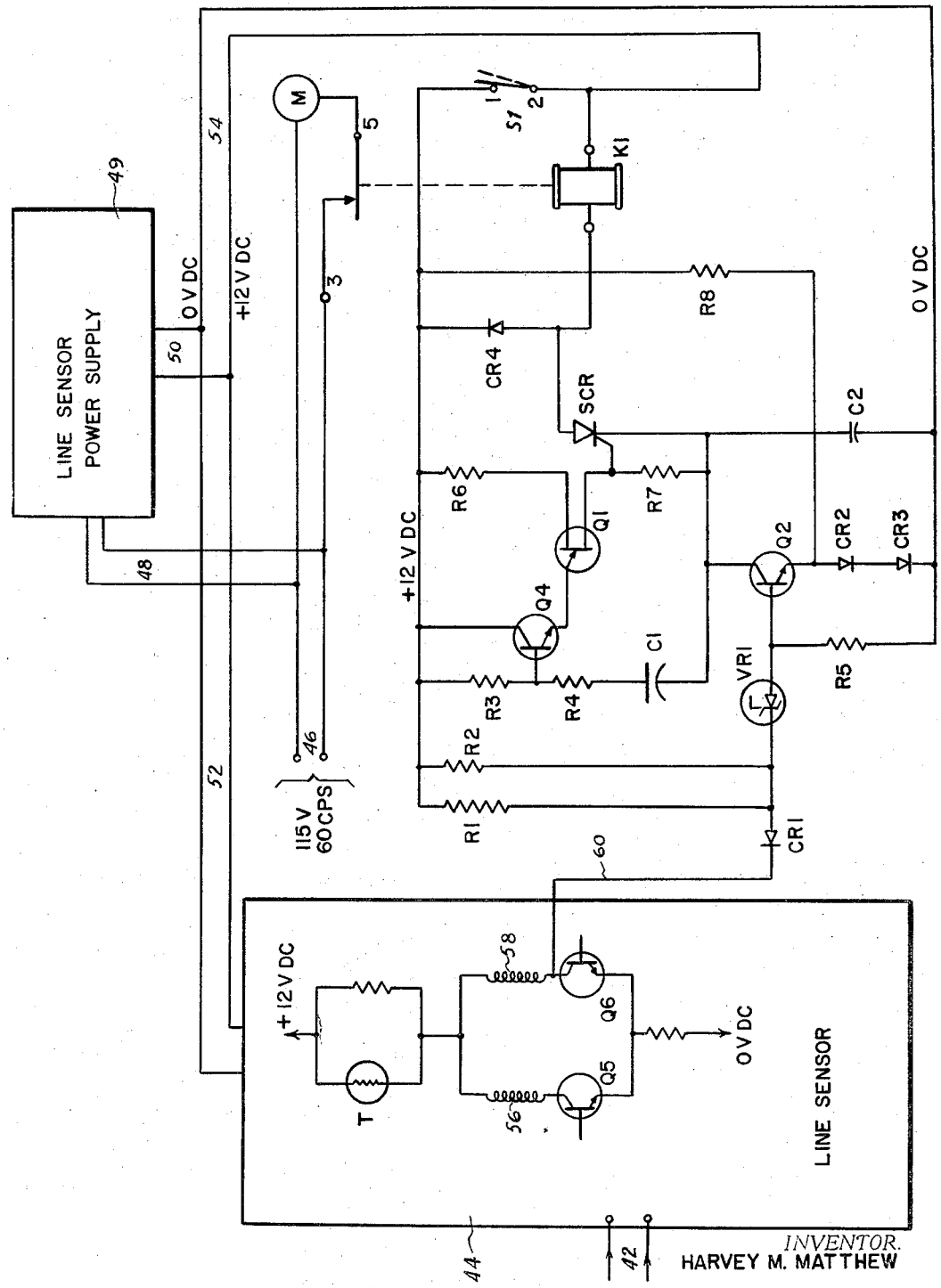

3,509,271
ELECTRONIC TIME DELAY MOTOR STOP
Harvey M. Matthew, New Haven, Conn., assignor to Mite Corporation, New Haven, Conn., a corporation of Delaware
Filed July 28, 1967, Ser. No. 656,938
Int. Cl. H04l 7/00
U.S. Cl. 178—4.1                                    3 Claims

ABSTRACT OF THE DISCLOSURE

The automatic stop circiutry for the driving motor of a telegraph printer comprises a time delay circuit, a switching circuit, and a motor relay operating circuit. The switching circuit may include a Zener diode, a transistor switch, and several resistors and diodes so coupled to the telegraph line as to be conductive when there is no signal. The switching transistor is in series with the time delay circuit and starts charging of a timing capacitor. When the timing capacitor has been charged without interruption for a predetermined desired time, it fires a silicon controlled rectifier which energizes a motor relay to stop the motor. The silicon controlled rectifier is again made non-conductive when signalling is renewed, as by connecting it to the switching transistor.

BACKGROUND OF THE INVENTION

In telegraph printers it is common to employ a local drive motor which runs in synchronism with a like motor at the remote transmitter. This drive motor operates even when no signal pulses are being received, which increases the wear of the motor and some associated mechanism. Moreover, in the case of portable equipment it is wasteful of battery current.

To overcome this difficulty, I provide an electronic stop mechanism which stops the local motor if no signal is received for a predetermined desired time, say one minute. The motor is restarted, however, upon the reception of a starting signal pulse. The term "pulse" is here used broadly, and applies to interruption of telegraph line current, because the usual practice is to maintain current on the line when no signal is being transmitted. The motor is restarted if the telegraph line current is interrupted by resumption of signalling.

Automatic stops have been devised which are mechanical in nature. One example of such a stop is disclosed in Howard Patent 2,913,517, issued Nov. 17, 1959. The present improvement provides an automatic stop which is electronic in nature, using solid state components, and requiring no moving mechanism other than a relay.

SUMMARY OF THE INVENTION

The automatic stop circuitry comprises a time delay circuit, a switching circuit, and a motor relay operating circuit. The time delay circuit includes a timing capacitor and means to charge the same at a desired rate. The switching circuit comprises a Zener diode, a transistor switch, and several resistors and diodes so coupled to the telegraph line as to be conductive when there is "mark" current on the telegraph line. The transistor is operatively connected with the time delay circuit and acts as a switch to start charging of the timing capacitor when it becomes conductive.

The relay operating circuit comprises a unijunction transistor so coupled to the time delay circuit that it becomes conductive when the timing capacitor has been charged continuously for a predetermined time. A silicon controlled rectifier has a gate supplied by the unijunction transistor. The coil of a motor relay is energized by the silicon controlled rectifier to stop the motor when the silicon controlled rectifier is made conductive. The silicon controlled rectifier is so connected to the switching transistor that it is made non-conductive when the switching transistor is non-conductive because of the absence of "mark" current on the telegraph line.

The foregoing and additional features are described in the following detailed specification, which is accompanied by a drawing showing an electrical diagram for the invention.

Referring to the drawing, the telegraph line is connected to terminals 42 of a line sensor 44 which may be conventional and requires no detailed description. The motor to be stopped is shown at M, it being supplied from an ordinary AC line, connected at terminals 46. The AC also energizes a 12 volt DC power supply indicated at 49, the input being shown at 48, and the 12 volt output at 50. The latter goes to the line sensor through conductors 52, and to the present motor stop through conductors 54. Motor M is controlled by the normally closed contacts 3–5 of a relay the coil of which is shown at K1. The stop circuit may be disabled by a manual switch S1.

A part of the line sensor 44 is shown at "mark" coil 56 with transistor Q5, and "space" coil 58 with transistor Q6. The stop circuitry is connected to the "space" branch by a conductor 60.

In most systems when the signal loop is not active a steady "mark" current exists, and the line sensor remains in the "mark" condition. If this condition exists for a desired time, say 60 seconds with no interruption, the motor stop circuit energizes the motor relay K1, thus deenergizign the motor M. When a "space" condition appears on the signal line, the motor relay K1 is deenergized and the motor is again started. If at any time during the 60 second delay a "space" signal should reappear on the line, the delay circuit is automatically reset, and the count begins again. Thus, to energize the motor relay to stop the motor, there must be a steady "mark" condition on the line for approxiamtely 60 seconds. The present circuitry senses the line condition from the "space" channel of the line sensor, but other forms of connection to respond to the condition of the telegraph line could be used, as explained later.

The automatic stop circuitry comprises a time delay circuit, a switching circuit, and a motor relay operating circuit. The time delay circuit has a timing capacitor C1 and means to charge the same at a desired rate. The switching circuit preferably comprises a Zener diode VR1 and means so coupling it to the telegraph line and the 12 volt power supply as to cause the switching transistor Q2 to be conductive when there is "mark" current on the telegraph line. The transistor Q2 acts as a switch, and starts charging of the timing capacitor C1 when the Zener diode VR1 breaks down or becomes conductive.

The relay operating circuit preferably comprises a unijunction transistor Q1 so coupled to the time delay circuit that it fires and becomes conductive when the timing capacitor C1 has been charged without interruption for a predetermined desired time. A silicon controlled rectifier SCR has a gate supplied by the unijunction transistor Q1. The motor relay coil K1 is energized through the silicon controlled rectifier SCR to stop the motor M when the silicon controlled rectifier is made conductive. The silicon controller rectifier is connected also to the switching transistor Q2 and therefore is turned off and made non-conductive when the switching transistor is shut off because there is no "mark" current on the telegraph line.

Considering the circuitry in detail, the switching transistor Q2 conducts for a "mark" signal, and is turned off for a "space" signal. When the line sensor is in the "mark" condition, transistor Q6 of the "space" branch is turned off, and its collector is at a potential of +8.5 volts DC. Diode CR1 is forward biased, and the parallel combination of resistor R1 and R2 is able to supply base drive, through Zener diode VR1, to saturate transistor Q2 and make it conductive. The collector of transistor Q2 is then at a potential of +1.6 volts DC, the sum of the voltage drops across diodes CR2, CR3 and the collector-emitter junction of transistor Q2. This allows the timing capacitor C1 to begin charging.

When the line sensor responds to the "space" condition, the collector of transistor Q6 is at +1.86 volts DC; diode CR1 is forward biased, and the junction of diode CR1, resistors R1, R2 and Zener diode VR1 is clamped at +2.83 volts DC. Since unit VR1 is a 3.6 volt Zener diode, it cannot now be broken down, and no current except a small amount of leakage flows through it. The junction of Zener diode VR1, resistor R5 and the base of transistor Q2 is at a potential of +0.8 volt. Since the emitter of transistor Q2 is at +1.36 volts, the base-emitter junction of transistor Q2 is reverse biased, and transistor Q2 is shut off. The collector of transistor Q2 is then at a potential of +12 volts DC, and therefore the timing capacitor C1 cannot charge. Resistor R8 and diodes CR2 and CR3 in series provide a regulated bias voltage at the emitter of transistor Q2.

Capacitor C2 is intended merely to slow down the response time of the switching circuit.

The timing circuit consists of a timing leg made up of resistors R3, R4 and timing capacitor C1. Resistor R3 is connected to the plus 12 volt power supply, and is connected in series with resistor R4 and timing capacitor C1. The negative terminal of capacitor C1 is connected to the collector of switching transistor Q2. When Q2 is saturated, its collector is at +1.6 volts, and the timing capacitor C1 begins to charge through resistor R3 and R4 toward plus 12 volts DC. There is a triggering circuit which consists of transistor Q4, unijunction transistor Q1, and resistors R6 and R7. When capacitor C1 reaches the breakover voltage of the unijunction transistor Q1, plus the base-emitter voltage drop of transistor Q4, the unijunction transistor Q1 fires, and then presents only a small impedance across capacitor C1, which capacitor then discharges through the emitter junction of transistor Q1.

This produces a flow of current in a resistor R7, and produces a voltage across it, which voltage is superimposed across the gate-to-cathode junction of the silicon controlled rectifier SCR. In addition, current is supplied to the gate of the silicon controlled rectifier, and it then conducts or latches in, and energizes the coil of motor relay K1, thereby opening relay contacts 3–5, and de-energizing the motor M. Once the silicon controlled rectifier is fired, it remains in conductive condition even after the flow of current into the gate and the voltage across it have ceased. Timing capacitor C1 having discharged, will again begin to charge, and periodically it will produce a pulse across resistor R7, but since the silicon controlled rectifier is already turned on, this pulse has no effect.

The relay driver section consists of the silicon controlled rectifier and the motor relay K. The silicon controlled rectifier and relay are connected in series with the switching transistor Q2. As long as transistor Q2 remains saturated, the potential at the anode of the silicon controlled rectifier, remains at +2.74 volts, and the relay remains energized. When a "space" signal appears, transistor Q2 shuts off, which in turn interrupts the current through the silicon controlled rectifier and shuts it off, thereby deenergizing the relay, and energizing the motor. Any charge on capacitor C1 leaks off through transistor Q4 and the unijunction transistor Q1. However, the pulse produced across resistor R7 is insufficient to fire the silicon controlled rectifier. The latter will fire only when the breakover potential previously discussed, is reached. To again energize the motor relay, there must be another delay of 60 seconds with a steady marking condition or current on the telegraph line 42.

Diode CR4 is used merely to suppress the inductive "spike" produced by the coil of the motor relay K1 when it is deenergized.

In one particular example of the illustrated circuitry the resistor R1 has a value of 1500 ohms, the resistor R2 is 1800 ohms, the resistor R3 is 360K ohms, the resistor R4 is 150 ohms, the resistor R5 is 1.5K ohms, the resistor R6 is 100 ohms, the resistor R7 is 100 ohms, and the resistor R8 is 3.3K ohms.

The timing capacitor C1 has a value of 150$\mu f.$, and capacitor C2 has a value of 0.022$\mu$. The diodes CR1, CR2 and CR3 are type 1N816. The zener diode VR1 is a type 1N747A. The transistor Q2 is a Type 2N2222A. The transistor Q4 is a type 2N930. The unijunction transistor Q1 is a type 2N489A. The silicon controlled rectifier SCR is a type 2N1771A.

It will be understood that the foregoing identification of component types, and the quantitative resistance and capacitance values, and also the voltage values given in the foregoing description, have been given solely by way of specific example, and are not intended to be in limitation of the invention.

It will be understood that when dealing with a telegraph system which is normally deenergized when there is no signal, the input connection 60 would be connected to the "mark" coil 56, instead of to the "space" coil 58. Moreover, it is not essential to work from a line sensor. The conductor 60 could be connected directly to the telegraph line when the system is one which is normally deenergized. Even with a system which is normally energized as is more frequently the case, the conductor 60 may be connected to the telegraph line through a transistor or equivalent device for phase reversal or inversion.

It is believed that the circuitry and operation of the automatic motor stop, as well as its advantages, will be apparent from the foregoing description. It will also be apparent that while I have shown the same in a preferred form, changes may be made without departing from the scope of the invention, as sought to be defined in the following claims. In the claims, the reference to the presence of a "mark" current when there is no signal is not intended to exclude minor adaptation for a telegraph line which is deenergized when there is no signal, as described in greater detail above.

I claim:

1. Automatic stop circuitry for the driving motor of a telegraph printer, which printer receives printing signals from a telegraph transmitting means, said circuitry comprising a time delay circuit, a switching circuit, and a motor actuating circuit, said time delay circuit including a timing capacitor and means to charge the same at a desired rate, said switching circuit comprising a transistor and means so coupling it to the telegraph transmitting means as to be conductive when there is no printing signal from the transmitting means, said transistor being operatively connected to the time delay circuit and acting as a switch to start charging of said timing capacitor when the transistor is turned on, said actuating circuit comprising a silicon controlled rectifier having a gate supplied by the timing circuit when the timing capacitor has been charged without interruption for a predetermined desired time, and a switching means which is operatively connected to the silicon controlled rectifier, said switching means being actuated to stop the motor when the silicon controlled rectifier is made conductive, in which the silicon controlled rectifier is connected to the switching transistor so that it is made non-conductive when the switching transistor is shut off.

2. Automatic stop circuitry as defined in claim 1, in which the switching circuit comprises a Zener diode, and means so coupling the Zener diode to the telegraph transmitting means as to break down and be conductive when there is no printing signal from the telegraph transmitting means, and in which said Zener diode causes the switching transistor to turn on for charging of the timing capacitor, or to shut off, thereby to control the conduction of the silicon controlled rectifier.

3. Automatic stop circuitry as defined in claim 2, in which the actuating circuit has a unijunction transistor so coupled to the time delay circuit that it fires and becomes conductive when the timing capacitor has been charged, and in which the unijunction transistor is connected to the gate of the silicon controlled rectifier to make the same conductive when the unijunction transistor fires.

References Cited

UNITED STATES PATENTS 2,652,446 9/1953 Oberman _____ 178—2
3,106,608 10/1963 Britt.
3,392,352 7/1968 White _____ 307—246

OTHER REFERENCES

General Electric Transistor Manual (6th edition), copyright 1962.

Silicon Zener Diode and Rectifier Handbook, 2nd edition, copyright 1961, Motorola, Inc.

JOHN W. CALDWELL, Primary Examiner

M. M. CURTIS, Assistant Examiner

U.S. Cl. X.R.

178—53.1, 69.5